Dec. 26, 1967  H. J. SHELTON, JR  3,360,207
HAMMERMILLS

Filed April 21, 1965  7 Sheets-Sheet 1

INVENTOR
HARRY J. SHELTON JR.
BY
*Alfred W. Petchaft*
ATTORNEY

Dec. 26, 1967  H. J. SHELTON, JR  3,360,207
HAMMERMILLS
Filed April 21, 1965  7 Sheets-Sheet 2

INVENTOR
HARRY J. SHELTON JR.
BY
ATTORNEY

Dec. 26, 1967  H. J. SHELTON, JR  3,360,207
HAMMERMILLS
Filed April 21, 1965  7 Sheets-Sheet 4

INVENTOR
HARRY J. SHELTON JR.
BY
*Alfred W Petchaft*
ATTORNEY

Dec. 26, 1967    H. J. SHELTON, JR    3,360,207

HAMMERMILLS

Filed April 21, 1965    7 Sheets-Sheet 5

INVENTOR
HARRY J. SHELTON JR.
BY
*Alfred W. Petchaft*
ATTORNEY

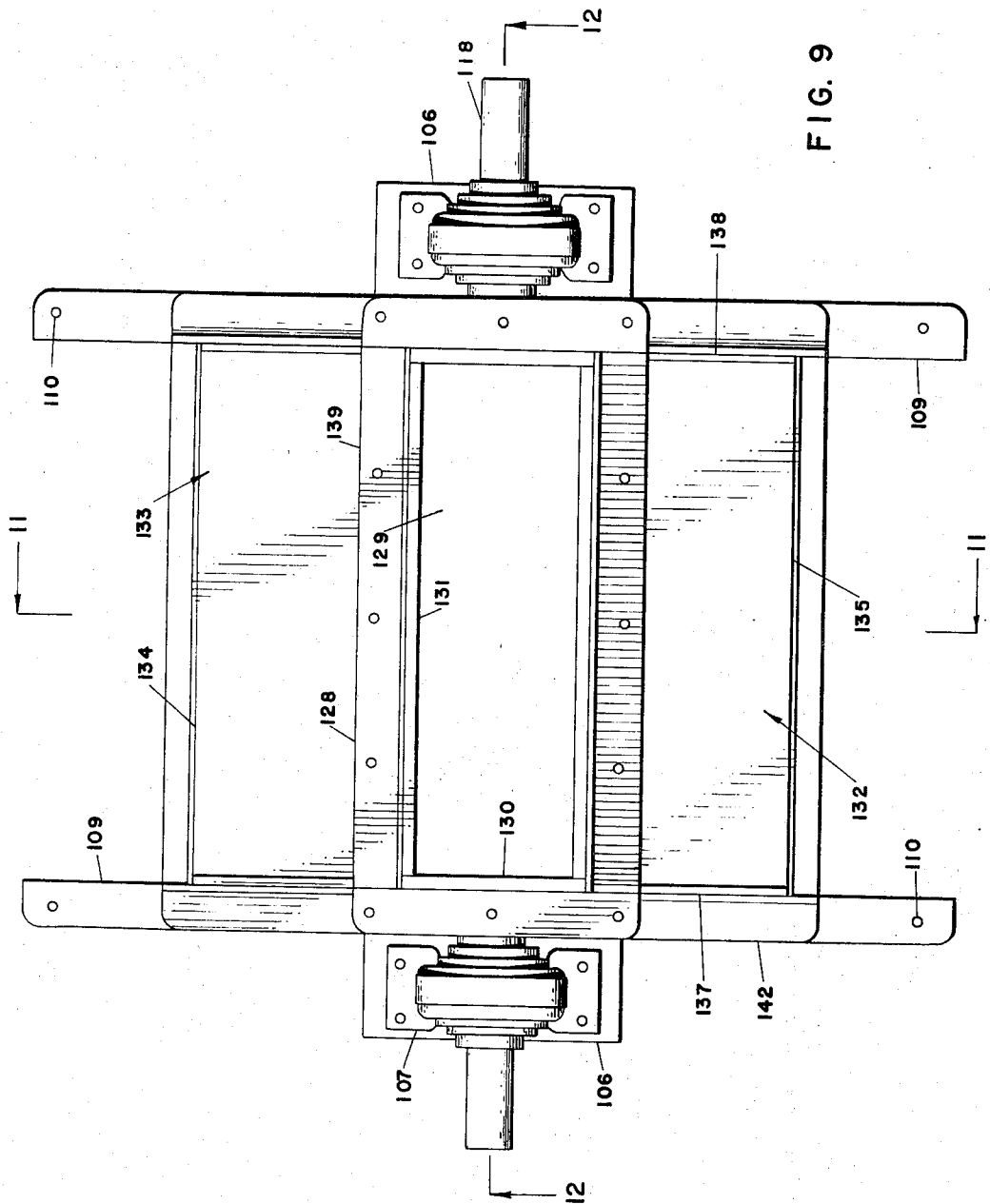

Dec. 26, 1967  H. J. SHELTON, JR  3,360,207
HAMMERMILLS

Filed April 21, 1965  7 Sheets-Sheet 7

INVENTOR
HARRY J. SHELTON JR.
BY
*Alfred W Letchaft*
ATTORNEY

United States Patent Office 3,360,207
Patented Dec. 26, 1967

3,360,207
HAMMERMILLS
Harry J. Shelton, Jr., 2915 N. Market St.,
Ladue, Mo. 64758
Filed Apr. 21, 1965, Ser. No. 449,828
19 Claims. (Cl. 241—285)

ABSTRACT OF THE DISCLOSURE

A hammermill including a housing having a rotor mounted on it. The rotor includes a rotor shaft having a plurality of spaced disks in between which hammers are swingably mounted. The housing is provided with an opening defined in part by upwardly presented rails and mounted on the rails is a top section. The top section and housing are provided with arcuate channels in which grates are located, the grates being in close proximity to the path defined by the hammers. The top section moves from a normally closed position wherein it covers the opening and extends over the rotor to an open position wherein the rotor and hammers are exposed. Furthermore, the grates can be removed from the top section and housing when the former is in its open position. The hammermill can also be provided with two sliding top sections located on each side of the inlet.

This invention relates in general to hammermills and, more particularly to hammermills having sliding top sections.

Due to the very nature of work accomplished by hammermills, the internal components thereof fracture or wear out quickly, and must be replaced. Therefore, access to the internal portion of the mill is highly desirable. Moreover, hammermills on occasion receive foreign elements or rocks of such size and hardness that they cause the mill to jam. Again, it becomes necessary to gain access to the internal components of the machines to relieve the jam. Furthermore, routine maintenance of hammermills is greatly simplified if the internal components of the mills are readily accessible.

Heretofore moderately-sized hammermills have been constructed having hinged top sections which swing back out of the way for maintenance of the interior, while the larger mills have removable top sections which must be lifted off by a crane. Both the hinged sections and removable sections are awkward to manipulate and considerable time must be consumed removing a multitude of bolts and other fastening devices before the sections can be swung away or removed, whichever the case may be.

It is, therefore, the primary object of the present invention to provide a hammermill to which one can readily gain access to the internal components thereof.

It is another object of the present invention to provide a hammermill of the type stated which is rugged in construction and economical to manufacture.

It is a further object of the present invention to provide a hammermill of the type stated having a top section which easily slides away and exposes the internal components of the mill.

With the above and other objects in view, my invention resides in the novel features of form, construction, arrangement, and combination of parts presently described and pointed out in the claims.

In the accompanying drawings—

Figure 3:
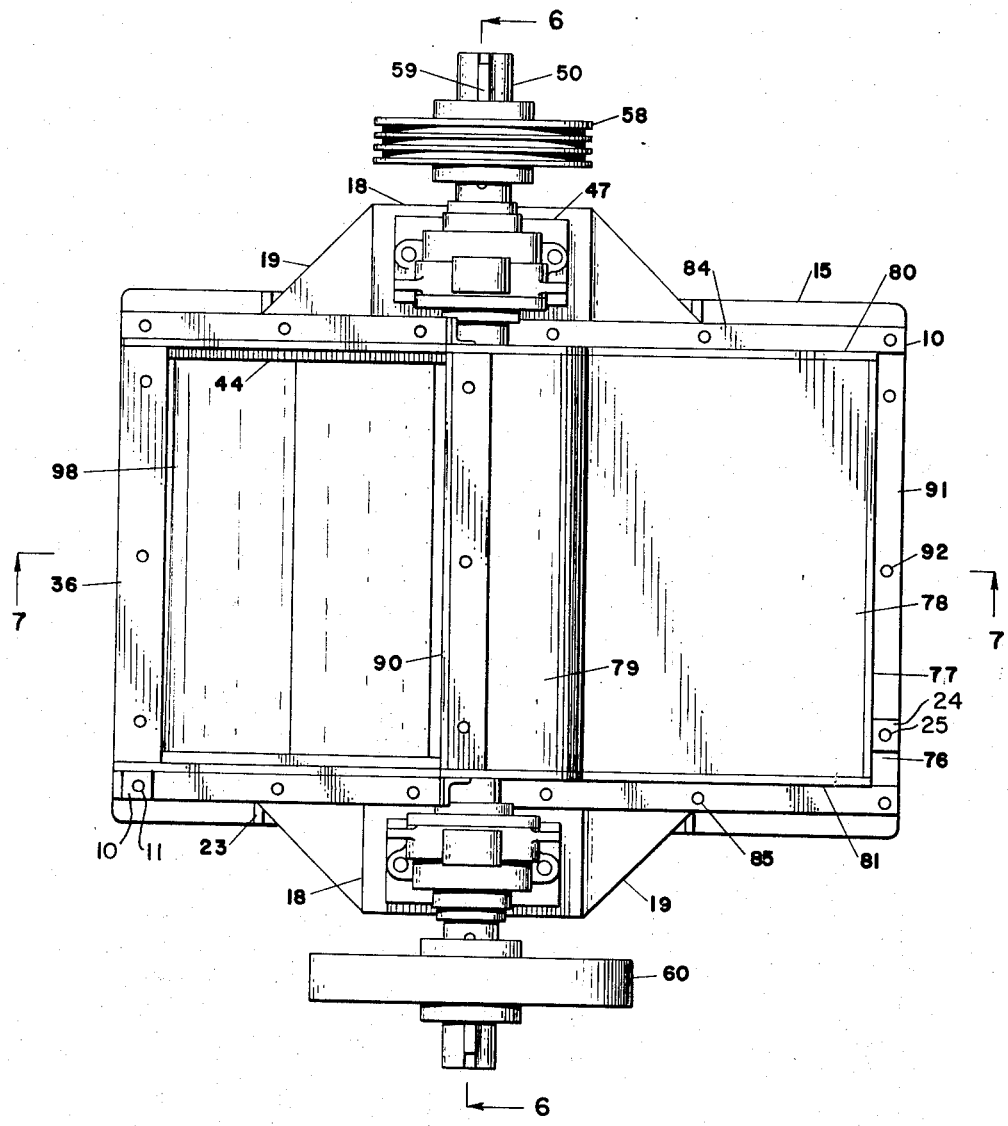
FIG. 3 is a top plan view of the hammermill.
Figure 4:
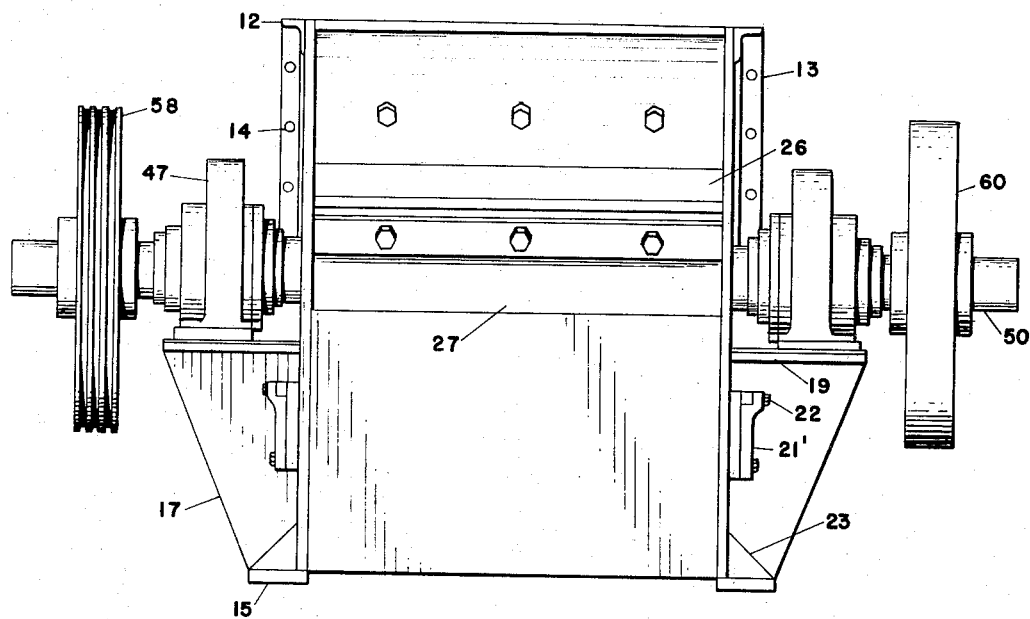
FIG. 4 is a front elevational view of the hammermill.
Figure 5:
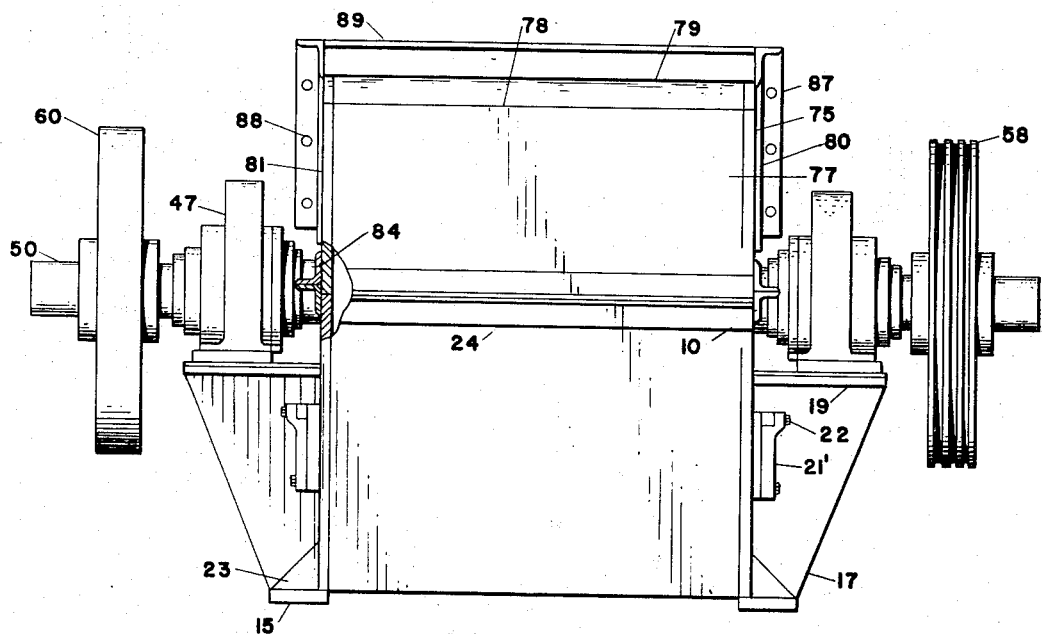
FIG. 5 is a rear elevational view, partially broken away, of the hammermill.
Figure 6:
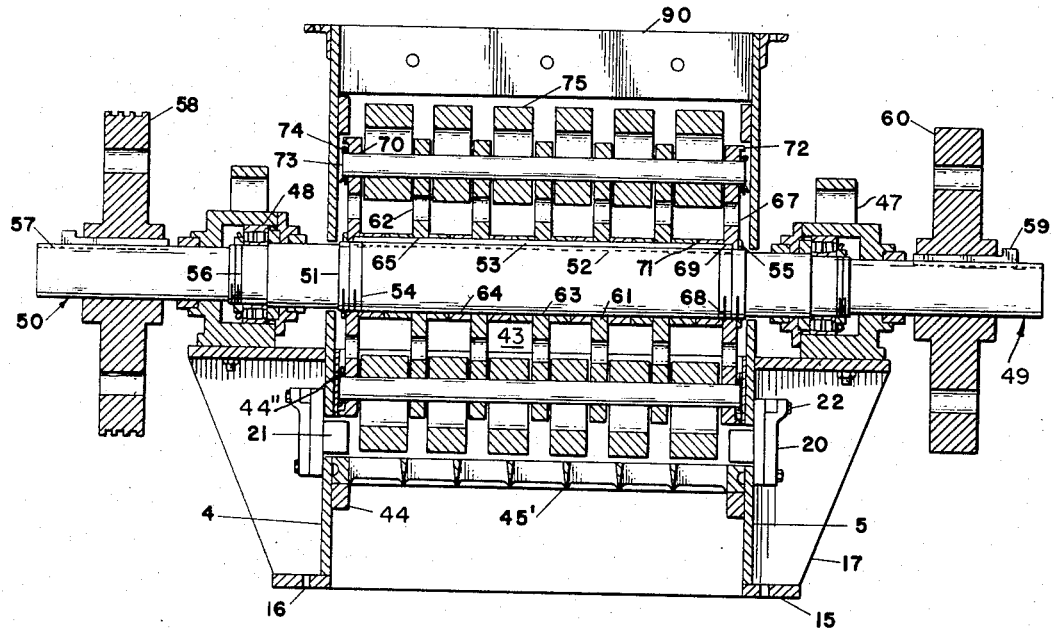
Figure 7:
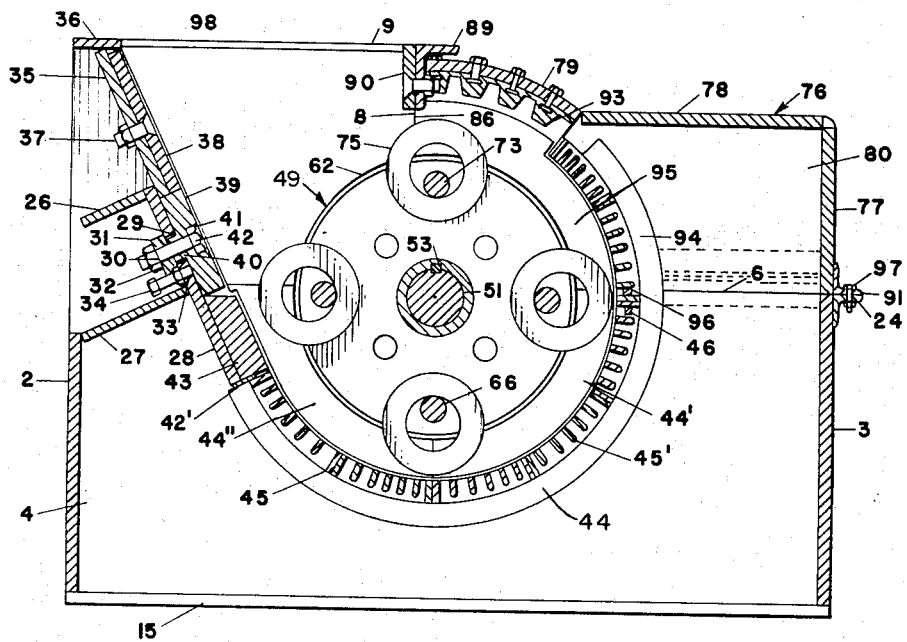
Figure 8:
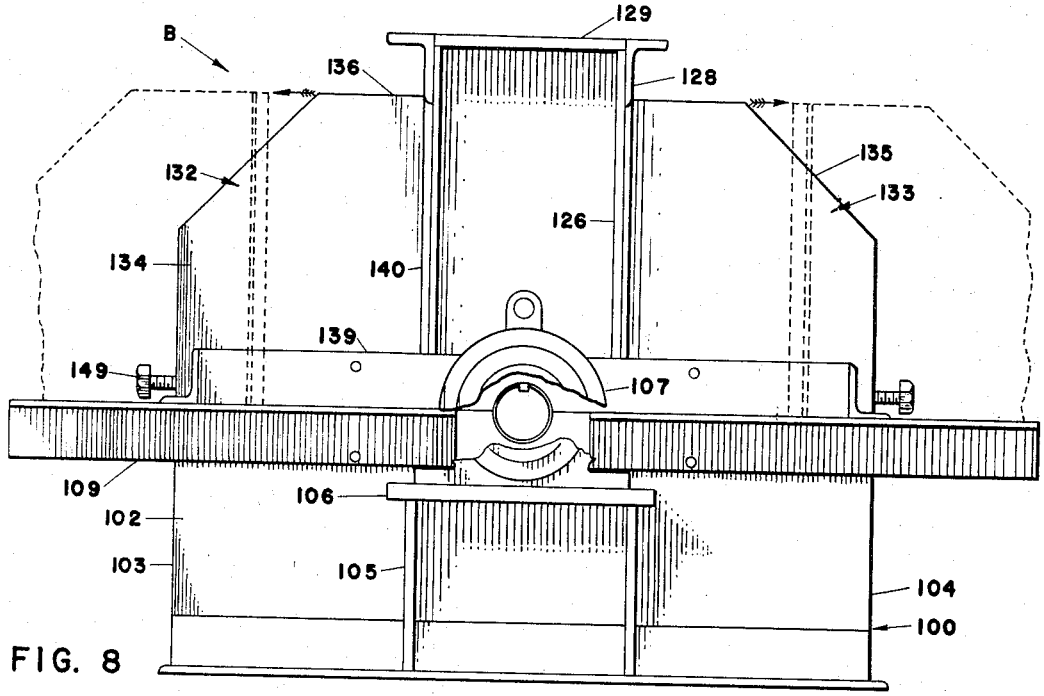
Figure 10:
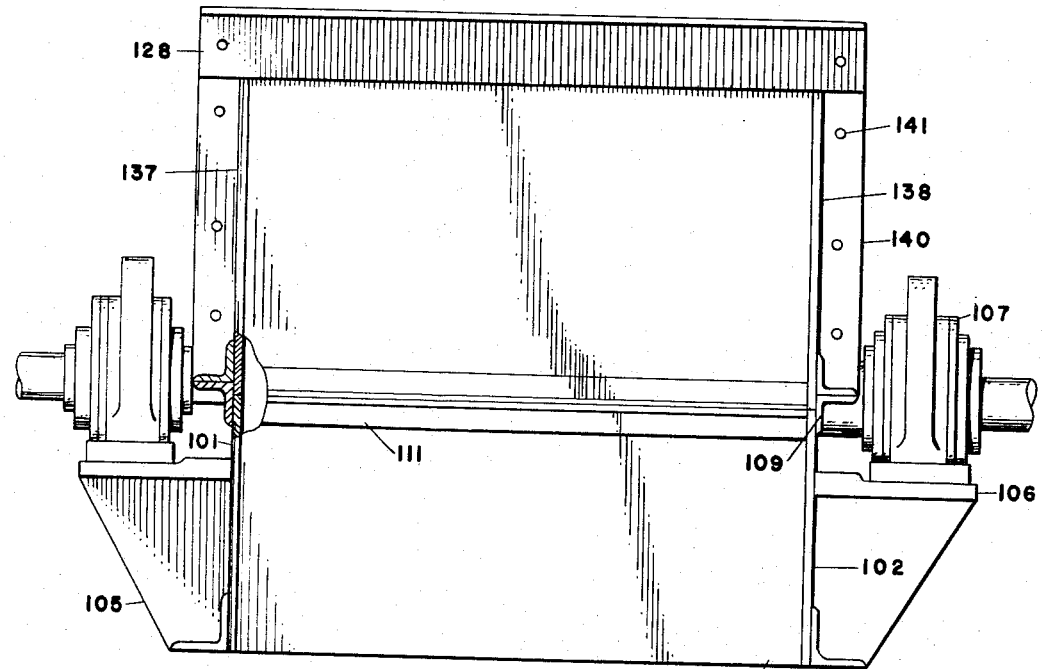
Figure 11:
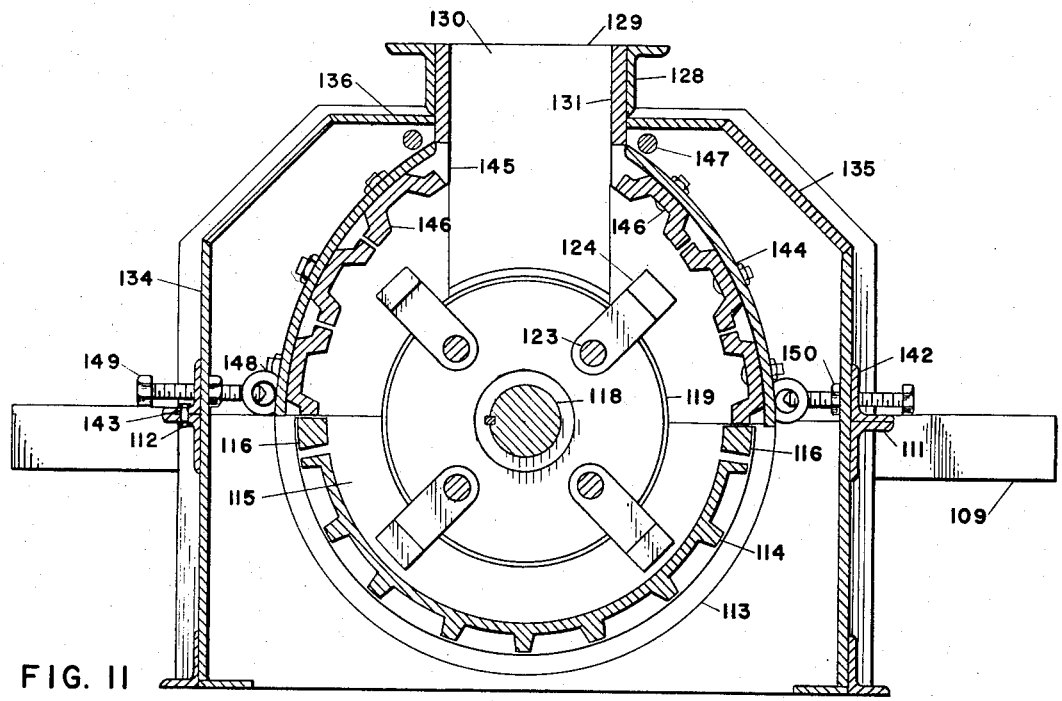
Figure 12:
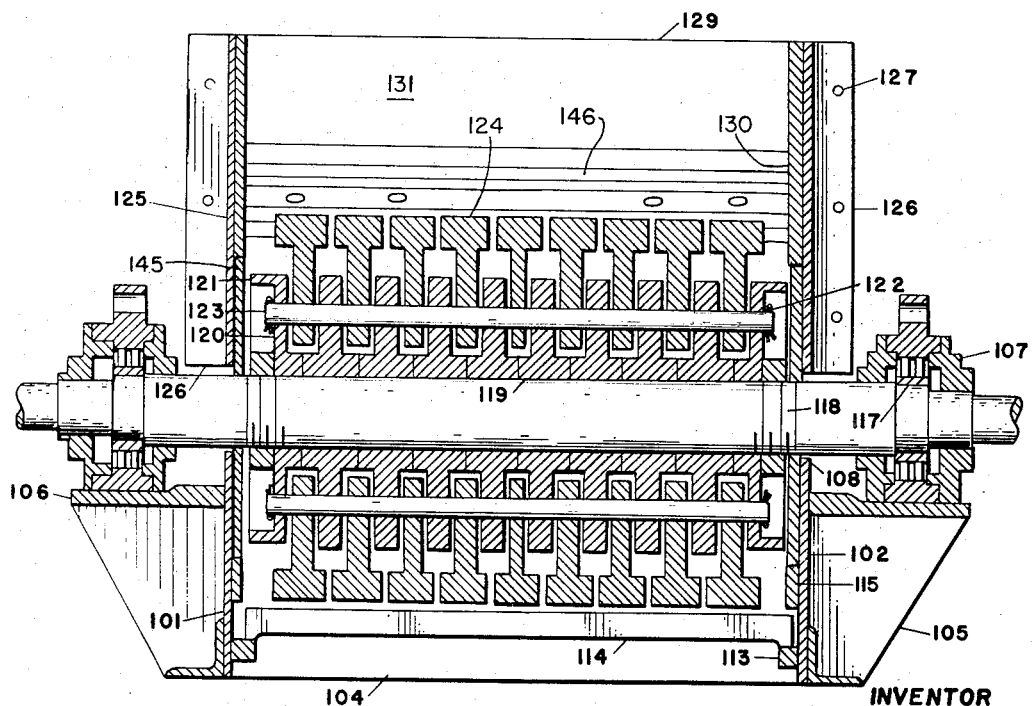

FIGS. 6 and 7 are sectional views taken along lines 6—6 and 7—7, respectively, of FIG. 3;

FIG. 8 is a side elevational view of a modified form of hammermill showing the top sections displaced in dotted lines and having the bearing partially broken away;

FIG. 9 is a top plan view of the modified form of hammermill;

FIG. 10 is a front elevational view of the modified hammermill partially broken away;

FIGS. 11 and 12 are sectional views taken along lines 11—11 and 12—12, respectively, of FIG. 9.

Referring now in more detail and by reference characters to the drawings which represent practical embodiments of the present invention, A designates a hammermill including a housing 1 having a vertical front wall 2 and a vertical rear wall 3 welded or otherwise suitably joined at their transverse margins by substantially L-shaped vertical side walls 4, 5. The side walls 4, 5 are provided with horizontal rear upper margins 6 which at their inwardly presented ends are relieved in the provisions of 180° arcuate cut-outs 7. Extending vertically and tangential from the arcuate cut-outs 7 are vertical margins 8 which perpendicularly intersect top margins 9. Welded or otherwise secured to the outer faces of side walls 4, 5 and projecting vertically slightly above the rear upper margins 6 and lengthwise along the walls 4, 5 from the cut-outs 7 beyond the rear wall 3 are outwardly projecting angles or rails 10, which are provided with a plurality of apertures 11. Bolted or otherwise secured to the side walls 4, 5 and flush with the top margins 9 thereof are outwardly projecting angles 12. Similarly, secured to the walls 4, 5 and projecting rearwardly from the vertical margins 8 are vertical angles 13 which are provided with a plurality of apertures 14. The angles 13 extend from the top of the margins 9, where they are partially relieved to accommodate the angles 12, to a position slightly above the cut-outs 7.

Welded to the bottom margins of the side walls 4, 5, projecting outwardly therefrom and extending the entire length thereof, are bottom flanges 15 which are provided with a plurality of apertures 16, the apertures 16 being adapted to receive mounting bolts (not shown) for securing the hammermill to the floor of a building or other solid structure. Welded to the side walls 4, 5 and flanges 15 in pairs and being symmetrically disposed on either side of the cut-outs 7 are vertical support members 17 which support the horizontal bearing mounting plates 18 in downwardly spaced relation from the cut-outs 7. Similarly welded to the front and rear margins of mounting plates 18 and walls 4, 5 are horizontal gusset plates 19.

In vertical alignment with the center of arcuate cut-outs 7 and in downwardly spaced relation to the mounting plates 18, the walls 4, 5 are each cut out to provide a rectangular aperture 20 which accepts an inwardly projecting plug 21, all for purposes presently more fully appearing. On their outwardly presented sides, each of the plugs 21 is firmly secured to a flange plate 21' which is held to walls 4, 5 by bolts 22. Finally, the side walls 4, 5 and bottom flanges 15 are reinforced with a plurality of vertical gusset plates 23.

Referring now to FIG. 7, it can be seen that rear wall 3 is provided with an outwardly projecting angle 24 which is flush with top margin thereof, and in downwardly spaced relation to the rails 10. Angle 24 is drilled in the provision of a plurality of apertures 25.

Figure 2:
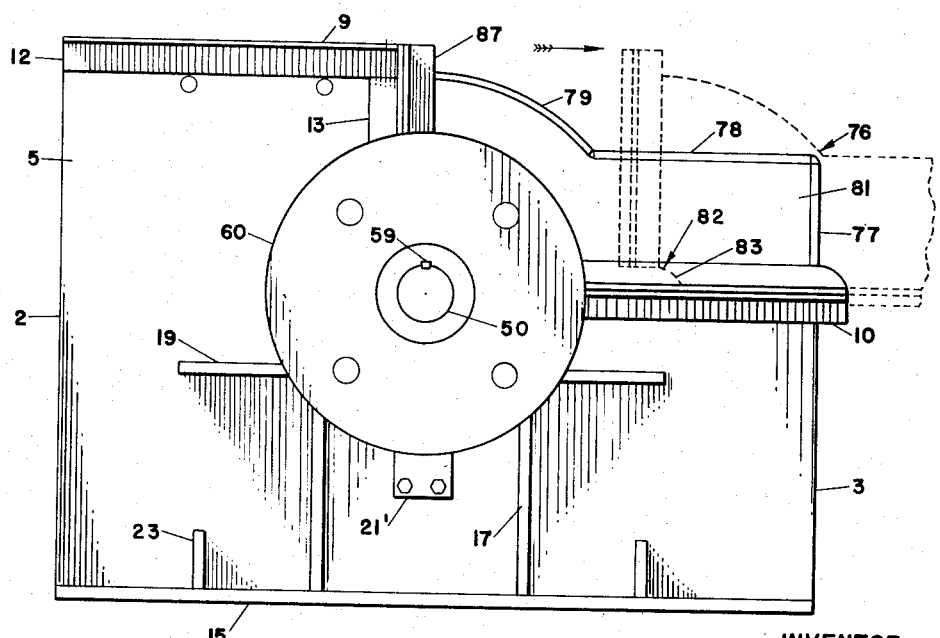
FIG. 2 is a side elevational view of a hammermill showing the top section partially displaced in dotted lines.

Internally the housing 1 is provided with the angularly disposed spaced parallel plates 26, 27 which are welded at their side margins to the internal faces of walls 4, 5. The lower plate 27 is further welded along its forwardly presented margin, that is to say, the left margin as seen in FIG. 7, to the upper margin of the front wall 2. Welded to the rearwardly presented margins of the plates 26, 27, perpendicularly thereto and extending downwardly from the upper plate 26 beyond the lower plate 27, is a backing plate 28, the side margins of which abut against and are welded to the internal faces of the side walls 4, 5. The backing plate 28 is provided with a plurality of enlarged apertures 29 and bolt receiving apertures 30. Forwardly disposed to and in facewise abutment with the backing plate 28 is a retainer plate 31 having a plurality of bolt receiving apertures 32 which are diametrically reduced from and in axial alignment with the enlarged apertures 29. Welded or otherwise securely fastened to the forwardly presented face of the backing plate 28, and in axial registration with the bolt receiving apertures 30 are threaded nuts 33 which accept bolts 34, all for purposes presently more fully appearing. Also welded to the side walls 4, 5 and extending partially over the rearwardly presented surface of backing plate 28 in parallel relation thereto is an upper backing plate 35, the upper margin of which is welded to a top plate 36, the latter having its upper face coplanar with the top margins 9 of walls 4, 5, all as best seen in FIGS. 2 and 7. Rigidly secured to the upper backing plate 35 by bolts 37 is a wear plate 38, the lower margin of which registers with the lower margin of the upper backing plate 35. Secured to the rearwardly presented face of backing plate 28 is a breaker plate 39 having a plurality of forwardly projecting cylindrical bosses 40 which register with and fit within the enlarged apertures 29 of the backing plate 28. The breaker plate 39 is further provided with a plurality of bores 41 which extend therethrough in axial alignment with the bosses 40 and accept bolts 42 which, in turn hold the breaker plate 39, backing plate 28, and retainer plate 31 together in a unitary structure. It can be seen that the bolts 34 bear against the rearwardly presented face of breaker plate 39 and provide a means for adjusting the angular pitch thereof.

Bolted to backing plate 28 and having its bottom margin in registration with the bottom margin thereof where it is in endwise abutment with a cross member 42' is a lower breaker plate 43.

Welded to the inner faces of walls 4, 5 in concentric relationship to the cut-outs 7 and extending from the cross member 42' to the rear upper margin 6 are arcuate support members 44. Bolted to the side walls 4, 5 and having arcuate margins in concentric spaced relation to the arcuate support members 44 are side liners 44' and 44". Resting on the support members 44 are a plurality of grates 45 each having a plurality of grate bars 45'. Transversely joining side walls 4, 5 and bolted thereto in proximity to rear upper margins 6 between side liner 44' and the arcuate support 44 is a cross bar 46 which prevents removal of the grates 45. By reference to FIG. 7, it can be observed that the first grate 45 has an inwardly presented surface which is substantially tangential to the rearwardly presented face of the lower breaker plate 43. It further can be observed that grates 45 are held firmly within the housing between side liners 44', 44" and arcuate members 44, while the cross member 42' and cross bar 46 prevent any peripheral movement thereof.

Referring now to FIG. 6, the mounting plates 18 have pillow blocks 47 bolted thereto which conventionally carry roller bearings 48 located in axial alignment with the cut-outs 7. The pillow blocks 47, being conventional in design and manufacture, are not described or illustrated herein in further detail. Rotatably carried by the pillow blocks 47 is a rotor 49 including a rotor shaft 50 having a diametrally enlarged center portion 51 which is axially milled or otherwise grooved to the provision of a keyway 52, the keyway 52 being sized to accept a key 53. At each end the center portion 51 is provided with threads 54 which engage lock nuts 55 for purposes presently more fully appearing. The outer ends of rotor shaft 50 are turned down in the provision of spindles 56 which journal within the bearings 48 of pillow blocks 47. The spindles 55 are partially milled away in the formation of keyways 57. One spindle 56 of rotor shaft 50 is provided with a multi-groove pulley 58, rigidly locked thereto by a key 59 which snugly fits within the keyway 57. A plurality of V-belts (not shown) are trained around pulley 58 and transmit power thereto from a conventional electric motor or other power source (not shown). At its outer end, the rotor shaft 50 is provided with a flywheel 60 which is similarly rigidly secured to the spindle 56 by a key 59. It should be noted that the flywheel 60 and the pulley 58 are interchangeable and can be mounted on either end of the rotor shaft 50.

Operatively mounted on the rotor shaft 50 are a plurality of inner rotor disks 61 each comprising a circular plate 62 having a center bore 63 which is diametrally sized to snugly fit over the center portion 51 of the rotor shaft 50. Axially welded to each side of circular plate 62 and having an internal bore which marginally registers with the bore 63 are spacer sleeves 64. The spacer sleeves 64 and bore 63 are axially grooved in the provision of a common keyway 65 which engages the key 53. Near its outer peripheral margin along radii spaced 90° apart, the circular plate 62 is bored in the provision of four apertures 66. In this regard it should be noted that any number of symmetrically disposed apertures 66 may be provided in each plate 65, four being used only for convenience of description and not by way of limitation. At either end with the rotor disks 61 interposed therebetween the center portion 51 of shaft 50 is provided with outer rotor disks 67 which are very similar to the rotor disks 61 and have a center bore 68, a keyway 69 which engages the key 53, and four apertures 70 which axially align with the apertures 66 of rotor disks 61. The outer rotor disks 67, however, have only one spacer sleeve 71 and at their outer peripheral margins are provided with outwardly projecting annular flanges 72 which revolve in close proximity to the top margin of the plugs 21 and the arcuate margins of the side liners 44', 44". Outer rotor disks 67 with inner rotor disks 61 interposed therebetween are held on the center portion 51 of the rotor shaft 50 by the nuts 55, the spacer sleeves 71, 64 being in endwise annular abutment, and the apertures 66, 70, being in axial registration.

Slidably fitted within each of the four axially aligned sets of apertures 66, 70 are hammer pins 73 which are provided at each end with a cotter pin 74 to prevent axial movement thereof. Loosely retained on the hammer pins 73 in the spaces between the rotor disks 61, 67 are a plurality of annular hardened steel hammers 75, which project outwardly from the rotor disks 61, 67 when the rotor 49 rotates so as to be in close proximity to, but not in contact with, the grate bars 45'.

As will be seen by reference to FIG. 6, the plugs 21 project into the housing 1 having their inwardly presented faces in close proximity to the sides of the outermost annular hammer 75. The upper and lower faces of the plug 21 are in close proximity to the peripheral surface of the outer rotor disks 67 and the upper surface of the grate segments 45, respectively.

Operatively supported on the rails 10 in closure forming relationship with the housing 1 is a top section 76 having a rear wall 77 welded at its top margin in perpendicular relationship thereto to a flat upper wall 78 which is welded along its forward margin to a curved upper wall 79.

Welded to the coplanar transverse margins of walls 77, 78, 79 are parallel top section side walls 80, 81 which are spaced to fit slidably between the rails 10. Side walls 80, 81 have lower margins 82 which are forwardly relieved in the provision of substantially quadrant-shaped cut-outs 83 which fit around the rotor shaft 50. Welded to the outwardly presented faces of the side walls 80, 81, slightly above and parallel to the lower margins 82, are the outwardly projecting support angles 84 which extend along the walls 80, 81 from the cut-outs 83 beyond the rear wall 77. The support angles 84 operatively support the top section 76 on the rails 10 so that the lower margins 82 of the side walls 80, 81 are in spaced parallel relation and in close proximity to the rear upper margins 6 of the housing side walls 4, 5. As previously noted the portions of side walls 80, 81 below the support angles 84 are more or less in slidable abutment with the vertical inwardly presented exposed faces of rails 10. Finally, the support angles 84 are provided with a plurality of apertures 85 which register with the apertures 11 of rails 10 when the top section 76 is closed.

Walls 80, 81 furthermore have vertical leading margins 86 which are adapted to align with the vertical margins 8 of housing side walls 4, 5. Welded to the outwardly presented faces of side walls 80, 81 and extending parallel in rearwardly spaced relation to the leading margin 86 from cut-out 83 beyond the curved upper wall 79 are the outwardly projecting vertical angles 87 having a plurality of apertures 88 which register with the apertures 14 of the vertical angles 13. Crosswise connecting vertical angles 87 and having one face coplanar with the leading margins 86 and its other face coplanar with the top margins 9 of housing side walls 4, 5 is a cross angle 89 to which is bolted a wear plate 90. Rear wall 77 of top section 76 on its outer face and parallel to its lower margin is provided with an outwardly projecting angle 91 which, when the top section 76 is in the closed position, comes into sliding abutment with the angle 24 of housing rear wall 3. The outwardly projecting portion of angle 91 is drilled in the provision of a plurality of apertures 92 which register with the apertures 25 of angle 24.

Internally the top section 76 is provided with a plurality of baffler bars 93 which extend in rows across the curved upper wall 79, the bars 93 being securely bolted thereto. Welded to the internal faces of side walls 80, 81 and forming a continuation of the arcuate support members 44 are the arcuate backing members 94 which provide a stop for additional grates 45. Concentrically disposed to the arcuate members 94 and forwardly spaced on the walls 80, 81 are the arcuate side liners 95 which serve as a forward stop for the grate segments 45 and prevent them from falling against the rotor 49. Transversely connecting the side walls 80, 81 between the arcuate members 94 and side liners 95 in proximity to the lower margin 82 is a retainer bar 96 which is bolted to the side walls 80, 81 and prevents the grate segments 45 from sliding downwardly and out of position.

Figure 1:
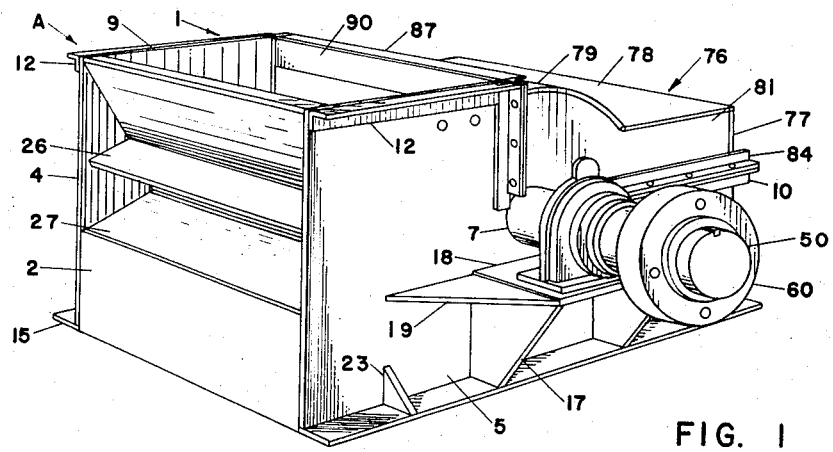
FIG. 1 is a perspective view of a hammermill constructed in accordance with and embodying the present invention.

To rigidly secure the top section 76 to housing 1 a plurality of bolts 97 are provided for insertion in the aligned apertures 25, 92; 14, 88; and 11, 85. As can be seen in FIGS. 1 and 7, the housing 1 and top section 76 form a unitary structure around the rotor 49, the structure having an upwardly presented opening or inlet 98 for receiving a charge of rock or other material to be crushed. The charge of rock, of course, falls against the wear plates 38, 90 whereupon it gravitates to the breaker plates 39, 43. The rotating hammers 75 crush the rock against the breaker plates 39, 43 and carry it along the grate bars 45' against the surface of which the rocks are further crushed. Eventually the crushed charge falls between the grate bars 45' into the lower portion of the housing 1 from which it is withdrawn from beneath.

Routine maintenance as well as major overhauls and repairs of the rotor 49 are performed by removing the bolts 97 from the respective apertures 25, 92; 14, 88; 11, 85 and sliding the top section 76 rearwardly on the rails 10. The portions of the top section side walls 80, 81 which project below the angles 84 will ride between the vertically presented upwardly projecting internal faces of angles or rails 10, thereby guiding the top section and preventing it from sliding off to one side or the other.

After the top section 76 is slid rearwardly individual hammers 75 can be removed and replaced simply by removing a cotter pin 74 and pulling a hammer pin 73 axially through the apertures 66, 70 until the desired hammer 75 is reached. If desired, the entire rotor 49 can be removed through the opening created by the displaced top section 76. Moreover, the grate segments 45 can easily be removed and replaced without disturbing rotor 49 by sliding them along the arcuate support members 44 after removing the cross bar 46. Similarly, the grates 45 can be removed from the top section 76 by withdrawing the latter until the retainer bar 96 passes beyond the angle 24 of rear wall 3. The bar 96 is then removed and the grates 45 are allowed to slide downwardly. It is also readily apparent that the baffler bars 93 can quickly be detached once the top section 76 has been displaced.

It should be further noted that when the top section 76 is in closure forming position the portion of side walls 80, 81 projecting forwardly beyond the vertical angles 87 fits slidably between the rearwardly projecting angles 13 of housing side walls 4, 5 until angles 13 facewise abut against angles 87. This construction not only provides a means for aligning the apertures 14, 88, but also lends additional rigidity to the structure.

Referring now to FIGS. 8 through 12, it is possible to provide a modified form of hammermill B which is similar to the hammermill A and includes a lower housing 100 having side walls 101, 102 transversely welded or otherwise connected at their vertical end margins by the end walls 103, 104 to form a box-like closure. Projecting outwardly from the side walls 101, 102 and supported by vertical gusset plates 105 which are welded thereto are bearing mounting plates 106 which, in turn, support the axially aligned bearings 107.

The upper margins of side walls 101, 102 are slightly relieved in the provision of arcuate rotor cut-outs 108 which are axially aligned and diametrally conform to a cylindrical surface passing through the inner races of bearings 107, all for purposes presently more fully appearing. Extending laterally along side walls 101, 102 from cut-outs 108 and projecting beyond the end walls 103, 104 are angles 109 having horizontal upper flanges or rails disposed in upwardly spaced parallel relation to the upper margins of the walls 101, 102, all as best seen in FIGS. 8 and 10. Near their outer extremities each of the angles 109 is provided with an aperture 110 for purposes presently more fully appearing. Welded to the end walls 103, 104 and having their horizontal flanges flush with the upper walls thereof and in downwardly spaced relation to the horizontal flanges of angles 109 are angles 111 which are provided with a plurality of apertures 112.

Internally the lower housing 100 is provided with semicircular support members 113 which are welded to the side walls 101, 102 in concentric relation to the cut-outs 108. Resting on the support members 113 are a plurality of grates 114 the upward displacement of which is prevented by arcuate side liners 115 which also have margins concentric to the cut-outs 108 but in radially inwardly spaced relation to the support members 113. Transversely connecting the side walls 101, 102 in proximity to their upper margins and bolted thereto between the support members 113 and side liners 115 are the cross bars 116 which prevent peripheral movement of the grates 114.

Carried by and journaled within the bearings 107 is a rotor 117 including a rotor shaft 118 provided with a plurality of inner rotor disks 119 interposed between the outer rotor disks 120. On their outer peripheries the outer rotor disks 120 are provided with laterally projecting annular flanges 121 which are adapted to revolve in close proximity to the side walls 101, 102 and inner margins of the arcuate side liners 115. Each of the rotor disks 119, 120 is provided with a plurality of equally spaced axially aligned apertures 122 which accept hammer pins 123. Interposed between the rotor disks 119, 120 and swingably mounted on the hammer pins 123 are a plurality of hammers 124, the outer margins of which are adapted to pass in close proximity to the grates 114.

Bolted to the horizontal flanges of angles 109 in close proximity to the rotor shaft 118 are upstanding members 125 having semi-circular cut-outs which permit the members 125 to straddle the rotor shaft 118. The upstanding members 125 are provided with outwardly projecting vertical flanges 126 which are drilled in the provision of a plurality of apertures 127. Bolted to the outwardly presented faces of flanges 126 and having flanged top margins which are flush with the upper margins of upstanding members 125 are the cross members 128. As can be seen by reference to FIG. 9, the cross members 128 and upstanding members 125 in effect form a rectangular opening or inlet 129. Bolted to the internal faces of upstanding members 125 and having arcuate lower margins which are in close proximity to the peripheral margins of the outer rotor disk flanges 121 are the side liners 130. Similarly bolted to the vertical inwardly presented faces of the cross members 128 are wear plates 131.

Resting on the rails of angles 109 on either side of the upstanding members 125 and in closure forming relation with the housing 100 are the top sections 132, 133 which being identical in construction, will be described with one set of reference numerals. The top sections 132, 133 each include a vertically presented end wall 134 which is welded along its upper margin to an oblique wall 135, which, in turn, is welded to horizontal top wall 136. The co-planar side margins of walls 134, 135, 136 are welded to spaced parallel side walls 137, 138 which are provided on their outwardly presented faces with angles 139 having outwardly projecting horizontal flanges which ride on the rails of angles 109. A small portion of the side walls 137, 138 projects below the horizontal flanges of the angles 139 in slidable abutment with the vertical inwardly presented faces of angles 109, all for purposes presently more fully appearing. The side walls 137, 138 at their vertical margins are provided with angles 140 having outwardly projecting flanges which abut against the flanges 126 of upstanding member 125. The angles 140 are provided with a plurality of apertures 141 which register with the apertures 127 of flanges 126. The end wall 134 is provided on its outer face with an angle 142 having a horizontal flange which is flush with the lower margin of the wall 134. The angle 142 is provided with a plurality of apertures 143 which register with the apertures 112 of angles 111.

Internally the top sections 132, 133 are each provided with an arcuate plate 144 which transversely extends from side walls 137, 138. The arcuate plate is not concentric with the rotor 117, but is in closest proximity to rotor 117 along its lower margin where it is also in juxtaposition to the semicircular support member 113 of lower housing 100, curving upwardly therefrom away from the periphery of rotor 117 and terminating in an upper margin which is in juxtaposition to the wear plate 131.

Bolted to the inner faces of side walls 137, 138 and curved on one side to conform with the contour of arcuate plate 144 whereby to serve as a support therefor, are the side liners 145 having inwardly presented margins which are curved to conform with and are in close proximity to the flange 121 on rotor 117. Bolted to the inwardly presented face of arcuate plate 144 are a plurality of transversely extending breaker bars 146. The opposite face of arcuate plate 144 bears against an upper backing cross-rod 147 which is welded or otherwise suitably secured at each end to the side walls 137, 138 in close proximity to the top wall 136. Near its lower margin the arcuate plate 144 bears outwardly against a lower backing cross-rod 148 which is supported by a plurality of spacer bolts 149. The shanks of the spacer bolts 149 extend horizontally through the vertical flange of the angles 142 and end wall 134, being operatively secured thereto by the nuts 150. As will be seen by reference to FIG. 11, the position of lower backing rod 148 and the force with which it bears against the outwardly presented surface of arcuate plate 144 can be adjusted by turning the bolts 149. Top sections 132, 133 are secured to the lower housing 100 by a plurality of bolts which fit within the aligned apertures 127, 141, and 112, 143, whereby to form a unitary structure.

In operation rotor 177 is revolved in either direction by a suitable prime mover which, being conventional in design and manufacture, is not shown or described herein. Centrifugal force will cause hammers 124 to project radially from between rotor disks 119, 120, and pass in close proximity to the grates 114. A charge of rock or other material to be crushed is dumped into the opening 129 the charge being crushed mainly against the breaker bars 146, but to a certain extent against the grates 114. The crushed charge eventually passes through the grates 114 and is removed from below the housing 100. It should be noted that hammermill B is constructed so that rotor 117 can be revolved in either direction which not only expedites the relieving of jams but also distributes wear between two sets of breaker bars 146.

When access to either the breaker bars 146 or rotor 117 is desired, it is only necessary to slide the top sections 132, 133 outwardly on the rails of angles 119. As was similarly described in conjunction with hammermill A, the top sections 132, 133 are laterally retained on the angles 109 by the portion of side walls 137, 138 projecting below the angles 139, that portion being in slidable abutment with the vertical inwardly presented faces of angles 109. The outward movement of top sections 132, 133, may, if desired, be limited as a safety measure by a bolt or pin removably inserted in the aperture 110 and projecting above the rail of angle 109.

The sliding sections 132, 133, of course, permit rapid replacement of damaged hammers 124 which involves nothing more than an axial removal of the hammer pin 123 in either direction until the damaged hammer 124 is freed, whereupon it is replaced and the hammer pin 123 is again passed through the aligned apertures 122.

Similarly, the construction expedites the replacements of grates 114 which are merely slid upwardly between arcuate members 113, 155 and out of the housing 100 after, of course, removing the appropriate cross-bar 116.

Finally, after the appropriate top section 133 or 134 is slid outwardly until arcuate plate 144 and breaker bars 146 clear the horizontal flange 142, by simply backing off the bolts 149 the arcuate plate 144 and breaker bar 146 can be withdrawn from beneath the top section 133 or 134 and in front of the respective end walls 103 or 104.

It should be understood that changes and modifications in the form, construction, arrangement, and combination of the several parts of the hammermills may be made and substituted for those herein shown and described without departing from the nature and principle of my invention.

Having thus described my invention, what I claim and desire to secure by Letters Patent is:

1. A hammermill comprising a housing having an upwardly presented opening, a rotor operatively mounted in the housing for rotation about an axis which extends transversely across the housing, and a top section slidably mounted on said housing for movement substantially in a direction perpendicular to said rotor axis into closure-forming position over said opening.

2. A hammermill comprising a housing having an upwardly presented opening, a rotor rotatably carried by said housing and partially projecting outwardly from said opening, and a top section slidably mounted on said housing for movement from a closed position to an open position, said top section when in the closed position being in closure-forming relation over said opening.

3. A hammermill comprising a housing having an upwardly presented opening, a rotor rotatably carried by said housing, a plurality of spaced rotatable disks secured to said rotor, hammers carried by said disks and projecting outwardly beyond the peripheral margins thereof, said disks and hammers being partially exposed through said opening, and a hood-forming top section slidably mounted on said housing for movement from closed position to an open position, said top section when in the closed position being in closure-forming relation to said opening, over and around said exposed portions of said disks and hammers.

4. A hammermill comprising a housing having upper margins partially defining an upwardly presented opening, a rotor operatively mounted in the housing for rotation about an axis which extends transversely across the housing, and a top section having bottom margins which register with the said upper margins of said housing, said top section being slidably mounted on said housing for movement substantially in a direction perpendicular to said rotor axis into closure-forming position over said opening.

5. A hammermill comprising a housing having a pair of side walls and end walls, said side walls having upper margins which partially define at least one upwardly presented opening, a rotor carried by said housing and being partially exposed through said opening, and at least one top section slidably mounted on said housing for movement from a closed position to an open position, said top section when in the closed position being in closure-forming relation to said opening, over and around said exposed portion of said rotor.

6. A hammermill comprising a housing having a pair of side walls and end walls, said side walls having upper margins which partially define an upwardly presented opening, a rotor operatively mounted in the housing for rotation about an axis which extends transversely across the housing and being partially exposed through said opening, a plurality of grates removably mounted in said housing in concentric relation to said rotor, said grates being removable through said opening, and a top section slidably mounted on said housing for movement substantially in a direction perpendicular to said rotor axis whereby to move from a closed position to an open position, said top section when in the closed position being in closure-forming relation to said opening.

7. A hammermill comprising a housing having a pair of side walls and end walls, said side walls having upper margins which partially define an upwardly presented opening, a rotor carried by said housing and being partially exposed through said opening, a plurality of grates slidably mounted in said housing in concentric relation to said rotor, said grates being removable through said opening, and a top section slidably mounted on said housing for movement from a closed position to an open position, said top section when in the closed position being in closure forming relation to said opening, over and around said exposed portions of said rotor.

8. A hammermill comprising a housing having a pair of side walls and a pair of end walls, said side walls having upper margins which partially define at least one upwardly presented opening, rails secured to said side walls, a rotor carried by said housing and being partially exposed through said opening, said housing being provided with an inlet disposed in upwardly spaced relation to said rotor, at least one top section slidably mounted on said rails for movement from a closed position to an open position, said top section when in the closed position being in closure forming relation to said opening, over and around said exposed portions of said rotor.

9. A hammermill comprising a housing having a pair of side walls and a pair of end walls, said side walls having upper margins which partially define an upwardly presented opening, angles secured to said side walls and having outwardly projecting flanges, a rotor carried by said housing and being partially exposed through said opening, said housing being provided with an inlet disposed in upwardly spaced relation to said rotor, and a top section slidably mounted on said flanges for movement from a closed position to an open position, said top section when in the closed position being in closure-forming relation to said opening, over and around said exposed portions of said rotor.

10. A hammermill comprising a housing having a pair of side walls and a pair of end walls, said side walls having upper margins which partially define at least one upwardly presented opening, rails secured to said side walls, a rotor carried by said housing and being partially exposed through said opening, said housing being provided with an inlet disposed in upwardly spaced relation to said rotor, and a top section having a pair of side walls which are co-planar to the side walls of said housing, flanged members secured to said top section side walls and being adapted to slidably abut against said rails whereby to permit said top section to move from a closed position to an open position, said top section when in the closed position being in closure-forming relation to said opening, over and around said exposed portions of said rotor.

11. A hammermill comprising a housing having a pair of side walls and a pair of end walls, said side walls having upper margins which partially define an upwardly presented opening, rails secured to said side walls, a shaft journaled in and extending transversely through the housing, a rotor carried by said shaft and being exposed through said opening for a portion of its periphery, said housing being provided with an intake inlet disposed in upwardly spaced relation to said rotor, a top section having a pair of side walls which are co-planar to the side walls of said housing, flanged members secured to said top section side walls and being adapted to slidably abut against said rails whereby to permit said top section to move from a closed position to an open position, said top section when in the closed position being in closure-forming relation to said opening, over and around said exposed portions of said rotor, and means for securely fastening said top section to said housing in the closed position.

12. A hammermill comprising a housing having a pair of side walls and a pair of end walls, said side walls having upper margins which partially define an upwardly presented opening, rails secured to said side walls, said rails having vertical faces which project upwardly beyond said upper margins, a rotor carried by said housing and being partially exposed through said opening, said housing being provided with an inlet disposed in upwardly spaced relation to said rotor, and a top section slidably mounted on said rails for movement from a closed position to an open position, said top section having side walls which fit slidably between said vertical faces of said rails, whereby to prevent said top section from sliding laterally off said rails, said top section being in closure-forming relation to said opening when in the closed position.

13. A hammermill comprising a housing having a pair of side walls and a pair of end walls, said side walls having upper margins which partially define an upwardly presented opening, rails secured to said side walls, said rails having vertical flanges which project upwardly beyond said upper margins and outwardly projecting horizontal flanges, a rotor carried by said housing and being partially exposed through said opening, said housing being provided with an inlet disposed in upwardly spaced relation to said rotor, and a top section having side walls which fit slidably between said vertical flanges of said rails, said top section having side walls provided with outwardly projecting flanges which slidably rest on said outwardly projecting horizontal flanges of said rails whereby to support the weight of said top section and to permit it to slide from a closed position to an open position, said top section when in the closed position being in closure-forming relation to said opening, over and around the exposed portions of said rotor.

14. A hammermill comprising a housing having a pair of side walls and a pair of end walls, said side walls having upper margins which partially define an upwardly presented opening, rails secured to said side walls, said rails having vertical flanges which project upwardly beyond said upper margins where said side rails are provided with outwardly projecting horizontal flanges, a rotor carried by said housing and being partially exposed through said opening, said housing being provided with an inlet disposed in upwardly spaced relation to said rotor, a top section provided with side walls which are co-planar to said housing side walls, said top section side walls having lower margins, and outwardly projecting flanges secured to said top section side walls in upwardly spaced parallel relation to said lower margins, said top section side walls being adapted to fit slidably between said vertical flanges of said rails, said top section outwardly projecting flanges being adapted to rest slidably on said housing outwardly projecting flanges, whereby to support the weight of said top section and to permit it to slide from a closed position to an open position, said top section when in the closed position being in closure-forming relation to said opening, over and around said exposed portions of said rotor.

15. A hammermill comprising a housing having a pair of side walls and a pair of end walls partially defining first and second upwardly presented openings, a rotor rotatably carried by said housing and being partially exposed through said openings, members defining an inlet disposed in upwardly spaced relation to said rotor and interposed between said first and second openings, and first and second top sections slidably mounted on said housing for movement from a closed position to an open position, said first and second top sections being in closure-forming relation to said first and second openings, respectively, when in the closed position.

16. A hammermill comprising a housing having a pair of side walls and a pair of end walls partially defining first and second upwardly presented openings, a rotor operatively mounted in the housing for rotation about an axis which transversely extends across said housing, members defining an inlet disposed in upwardly spaced relation to said rotor and interposed between said first and second openings, first and second top sections slidably mounted on said housing for movement substantially in a direction perpendicular to said rotor axis whereby to move from a closed position to an open position, said first and second top sections being in closure-forming relation to said first and second openings, respectively, when in the closed position, and breaker bars removably carried by said top sections.

17. A hammermill comprising a housing having a pair of side walls and a pair of end walls partially defining first and second upwardly presented openings, a rotor rotatably carried by said housing and being partially exposed through said openings, members defining an inlet disposed in upwardly spaced relation to said rotor and interposed between said first and second openings, first and second top sections slidably mounted on said housing for movement from a closed position to an open position, said first and second top sections being in closure-forming relation to said first and second openings, respectively, when in the closed position, and a plurality of grates slidably mounted within said housing in concentric relation to said rotor, said grates being removable through said opening when either of said top sections are in the open position.

18. A hammermill comprising a housing having a pair of side walls and a rear wall partially defining an upwardly presented opening, a rotor operatively mounted in said housing for rotation about an axis which extends transversely across the housing, members defining an inlet disposed in upwardly spaced relation to said rotor and offset to one side thereof, and a top section slidably mounted on said housing for movement substantially in a direction perpendicular to said rotor axis whereby to move from a closed position to an open position, said top section when in the closed position being in closure-forming relation to said opening over and around a portion of said rotor.

19. A hammermill according to claim 18 and having a plurality of grates slidably mounted in said housing, said grates being removable through said opening when said top section is in the open position.

References Cited

UNITED STATES PATENTS

| | | | |
|---|---|---|---|
| 1,743,911 | 1/1930 | Borton | 241—285 |
| 2,292,852 | 8/1942 | Werner | 241—189 |
| 2,554,071 | 5/1951 | Strawn | 241—285 |

WILLIAM W. DYER, JR., *Primary Examiner.*

R. J. ZLOTNIK, *Assistant Examiner.*